B. DAHL.
WHEEL RIM.
APPLICATION FILED JAN. 29, 1912.
1,134,592.
Patented Apr. 6, 1915.
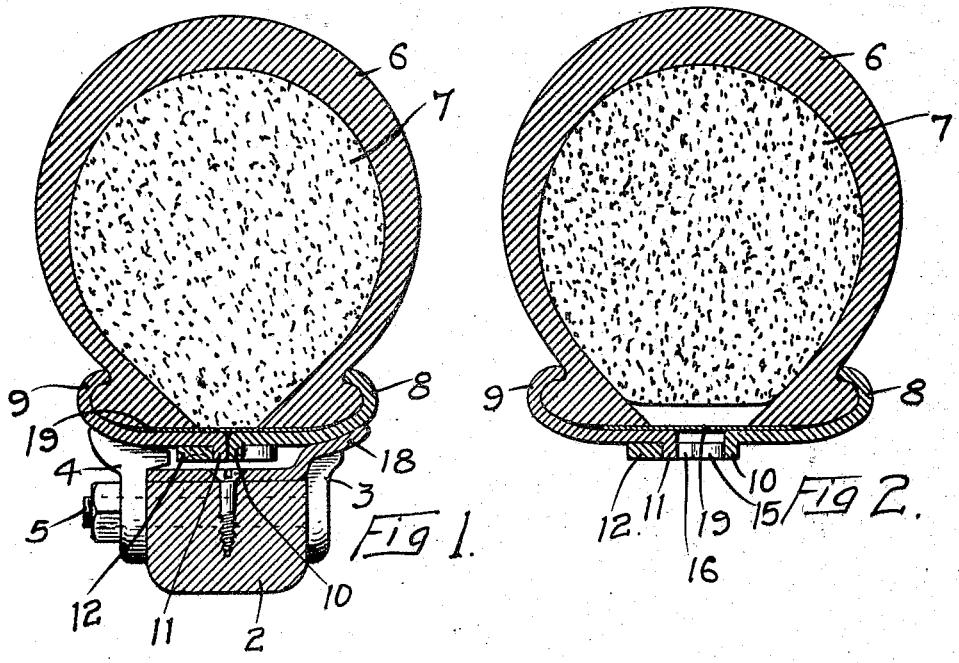
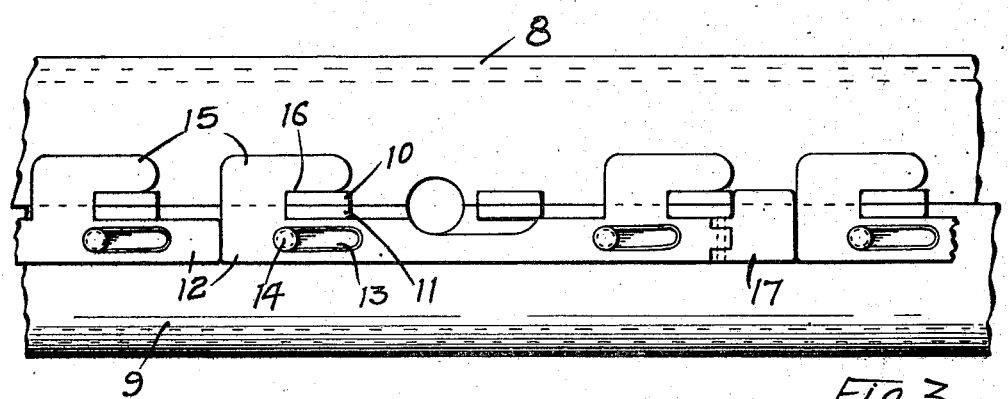
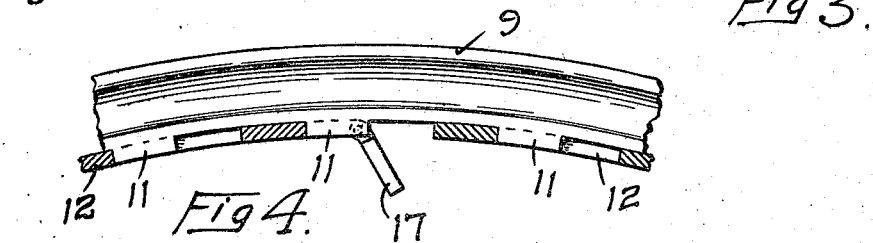
WITNESSES
INVENTOR
BENJAMIN DAHL
BY
ATTORNEYS

UNITED STATES PATENT OFFICE.

BENJAMIN DAHL, OF MINNEAPOLIS, MINNESOTA.

WHEEL-RIM.

1,134,592.

Specification of Letters Patent.

Patented Apr. 6, 1915.

Application filed January 29, 1912. Serial No. 674,094.

*To all whom it may concern:*

Be it known that I, BENJAMIN DAHL, of Minneapolis, Hennepin county, Minnesota, have invented certain new and useful Improvements in Wheel-Rims, of which the following is a specification.

My invention relates to wheel rims designed particularly for use with punctureless tires, or those wherein a yielding filler is employed in place of the usual pneumatic tube.

The object of the invention is to provide a simple, inexpensive device by means of which the opposing annular sections of the rim can be easily and quickly locked together.

My invention consists generally in a rim composed of annular sections having abutting edges, and a loose band locking said abutting edges together.

In the accompanying drawings forming part of this specification, Figure 1 is a transverse sectional view showing the rim sections in their locking position, Fig. 2 is a similar view, before the sections are drawn together to compress the filler, Fig. 3 is a detail view, illustrating the application of the locking means to the rim sections, Fig. 4 is a detail sectional view, showing the preferred means for disengaging the locking band from its locking position.

In the drawing, 2 represents a felly provided with clips 3 and 4 secured to the felly by a bolt 5.

6 is the outer casing and 7 the filler.

8 and 9 are the rim sections, having outer edges adapted to engage the lips of the casing. The inner abutting edges of said sections have lips 10 and 11 formed thereon which bear upon one another when the sections are squeezed together by the application of a suitable clamp to the other portions of the sections.

For the purpose of locking the rim sections together when the filler has been compressed, I provide a series of plates 12, each having longitudinal slots 13 to receive pins on the rim sections 9. These slots and pins allow a limited longitudinal movement of the plates. The plates are provided on one side with lateral extensions 15 having recesses 16 therein which are adapted to receive the lugs 10 and 11 when the plates are moved lengthwise in one direction, thereby holding the rim sections securely in their locking position.

For the purpose of holding the plates against premature longitudinal movement I provide a hinged section 17 on one of the plates that is adapted to bear against the end of the adjoining plate when the parts are assembled, thereby forming in effect a continuous locking band around the rim.

The plates will be attached to the rim sections 9 by the pins 14 and cannot become separated therefrom or loose, and may be moved to their locking position when the filler is put under compression, and when all the plates have been adjusted the hinged section 17 is forced outwardly to the position shown in Fig. 3 and the plates will not only be securely locked on the rim but the rim lugs will be firmly clamped together and the sections of the rim will grip the lips of the casing and hold the filler in its compressed position, as indicated in Fig. 1. To release the filler, the hinged section 17 is forced out of engagement with the end of the adjacent plate by means of a suitable tool, as indicated in Fig. 4.

A plate 18 is preferably interposed between the sections of the rim and the felly and a comparatively thin plate 19 is inserted between the rim sections and the lips of the casing to prevent dust and dirt from working into the casing and filler between the edges of the rim sections.

I claim as my invention:—

1. A wheel rim composed of annular sections having inner abutting edges, a locking band composed of sections encircled by said rim sections and movable lengthwise independently of one another and having means for interlocking with said rim sections and securing them together, one of said band sections having a pivoted portion at one end that is adapted to contact with the end of the adjoining section and thereby lock all of the sections against longitudinal movement.

2. A demountable rim comprising annular rim sections having inner abutting edges and inwardly projecting lugs formed on said abutting edges and seated against one another, and a locking band divided transversely into a series of sections and mounted for endwise movement on one of said rim sections and having means to engage and clamp said abutting lugs together.

3. A demountable rim composed of annular sections having inner abutting edges, a locking band comprising a series of curved sections placed end to end within the circumference of said rim sections and having a limited circumferential movement, a gap being provided between two adjoining sections of said band, a locking means for closing said gap and holding said band sections temporarily against circumferential movement, said band sections having means for engaging said rim sections and locking them together.

4. A demountable rim comprising annular rim sections having inner abutting edges, a locking band divided transversely into a series of sections placed end to end within the circumference of said rim sections and having slot and pin connections with one of said rim sections for endwise movement thereon independently of one another, said band sections having means for engaging with the other rim section for locking said rim sections together.

5. A demountable rim comprising annular rim sections having inner abutting edges, a locking band divided transversely into a series of abutting sections placed end to end within the circumference of said rim sections and having slidable connections with one of said rim sections for endwise movement thereon, independently of one another, said band sections having means for engaging with the other rim section for locking said rim sections together.

6. A demountable rim comprising annular sections having inner abutting edges, a locking band divided transversely into a series of abutting sections placed end to end, said sections having a limited circumferential movement with respect to said rim sections and provided with means for engaging and locking said rim sections together, and means for holding said band sections against premature lengthwise movement.

7. A demountable rim composed of annular rim sections, a locking band transversely divided into a series of abutting sections having means for engaging and locking said rim sections together, said band sections being slidably mounted on said rim sections for a limited circumferential movement thereon, and means for holding said band sections against premature lengthwise movement.

8. A demountable rim composed of annular sections having opposing edges, a locking band composed of a plurality of abutting sections, slidably mounted on said rim sections and having means for engaging said rim sections and locking them together, said band sections having a limited circumferential movement with respect to said rim sections for locking or releasing said rim sections.

In witness whereof, I have hereunto set my hand this 25th day of January 1912.

BENJAMIN DAHL.

Witnesses:
GENEVIEVE E. SORENSEN,
EDWARD A. PAUL.

Copies of this patent may be obtained for five cents each, by addressing the "Commissioner of Patents, Washington, D. C."